Figure 1:
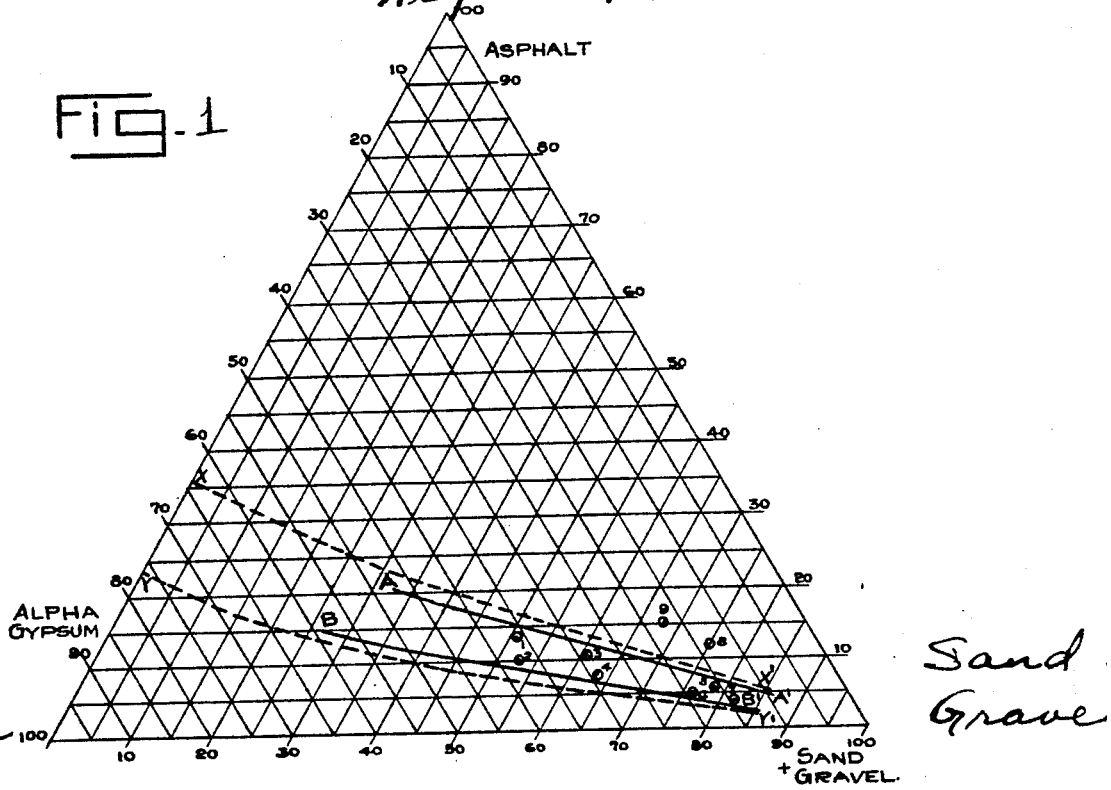

March 14, 1933.    H. K. LINZELL    1,901,055

MASTIC FLOORING, COMPOSITION, AND METHOD OF PREPARING

Filed Jan. 30, 1931    2 Sheets-Sheet 1

INVENTOR
HARRY K. LINZELL.
BY
L. A. Paley
ATTORNEY

March 14, 1933. H. K. LINZELL 1,901,055
MASTIC FLOORING, COMPOSITION, AND METHOD OF PREPARING
Filed Jan. 30, 1931 2 Sheets-Sheet 2

INVENTOR
HARRY K. LINZELL.
BY
L. A. Paley
ATTORNEY

Patented Mar. 14, 1933

1,901,055

UNITED STATES PATENT OFFICE

HARRY K. LINZELL, OF LA GRANGE, ILLINOIS, ASSIGNOR TO UNITED STATES GYPSUM COMPANY, OF CHICAGO, ILLINOIS, A CORPORATION OF ILLINOIS

MASTIC FLOORING, COMPOSITION, AND METHOD OF PREPARING

Application filed January 30, 1931. Serial No. 512,296.

This invention relates to compositions of matter and has reference more particularly to bituminous compositions suitable for use as flooring, or for other molding purposes.

It has been common practice to utilize mastic compositions for flooring, these compositions consisting of mixtures of Portland cement, and emulsified asphalt, together with aggregates such as sand, gravel, etc. Owing to the long setting time required for Portland cement, these forms of mastic compositions have the disadvantage that the floor cannot be used for several days after it is laid, since destruction of the floor would result if earlier use were permitted. The Portland cement mastic compositions also have the disadvantage that a high percentage of emulsified asphalt is required in order to produce a given masticity, with a resultant abnormal cost of materials. The Portland cement mastics had also the disadvantage that they shrink considerably on setting and drying with the result that cracks were produced in the floor. Light duty floors of Portland cement mastic have the disadvantage that they tend to dust on the surface after a period of use due to a continued and progressive hardening of the Portland cement.

Portland cement mastic floors are also attacked rapidly by certain acids commonly used in industrial work. The Portland cement mastic floors are also not as resistant to wear as could be desired.

An object of this invention, therefore, is to provide an improved mastic flooring composition which will have superior qualities as to wear and acid resistance, quick initial and final set, and little or no expansion on setting; also to improve mastic floors and other molded objects in other respects hereinafter specified and claimed.

While the composition is designed especially for use for floor, it may also be used as a plaster and for various other molded objects where water resistance is desired.

In the co-pending application of Randall and Dailey, Serial No. 384,343, filed August 9, 1929, and entitled "High strength calcined gypsum", a new high strength calcined gypsum is described, together with its method of manufacture. This high strength calcined gypsum has unique properties in that its compressive and tensile strength equals or exceeds that of Portland cement, whereas its setting time is approximately that of ordinary plaster of Paris, viz. 15 to 30 minutes. The compressive strength of this product will range from 2500 to 5750 lbs. per square inch and it has a pouring consistency of less than 50 cc. Ordinary gypsum plasters have a pouring consistency, depending upon the source of the raw gypsum, fineness of grind, and method of calcination (kettle or rotary calciners, time, temperature, etc.) of 52 to 96 cc.'s per 100 grams of stucco, with a compressive strength varying from 1200 pounds per square inch to 2500 pounds per square inch. This high strength calcined gypsum which I shall in the future designate as alpha gypsum, is manufacture by treating lumps of gypsum rock having a diameter of ½" to 2" in a closed container with steam at 17 to 20 lbs. gage pressure. Steam at 15 to 50 lbs. pressure may be used, but outside of the preferred range of 17 to 20 lbs. gage, the strength and quality of the resulting product diminishes.

This steam calcination is carried on for five to seven hours with a constant steam pressure and with a constant withdrawal of water of condensation obtained from the heating steam and also from the expelled water of crystallization. After calcination, the product is dried while maintaining at a temperature under 400° F., and the product is ground so that 85% or more of same passes through a 100 mesh screen.

The crystals of ordinary first settle calcined stucco or gypsum as seen under crossed nicols in a petrographic microscope, appear very fine and needle-like, these crystals being mostly less than five microns in diameter. The crystals of alpha gypsum when viewed at the same magnification under the same microscope, appear rather short, thick and well formed. The crystals of alpha gypsum are practically pure crystalline calcium sulphate hemihydrate, and as seen under this microscope, appear brilliantly colored, while little or no color is visible in the case of the tiny, needle-like, crystals of ordinary plaster of Paris. The unique properties of this alpha gypsum has enabled me to prepare a composition suitable for mastic floors utilizing this ingredient, which has many points of superiority over the standard compositions utilizing Portland cement as the cementitious material.

Figure 2:
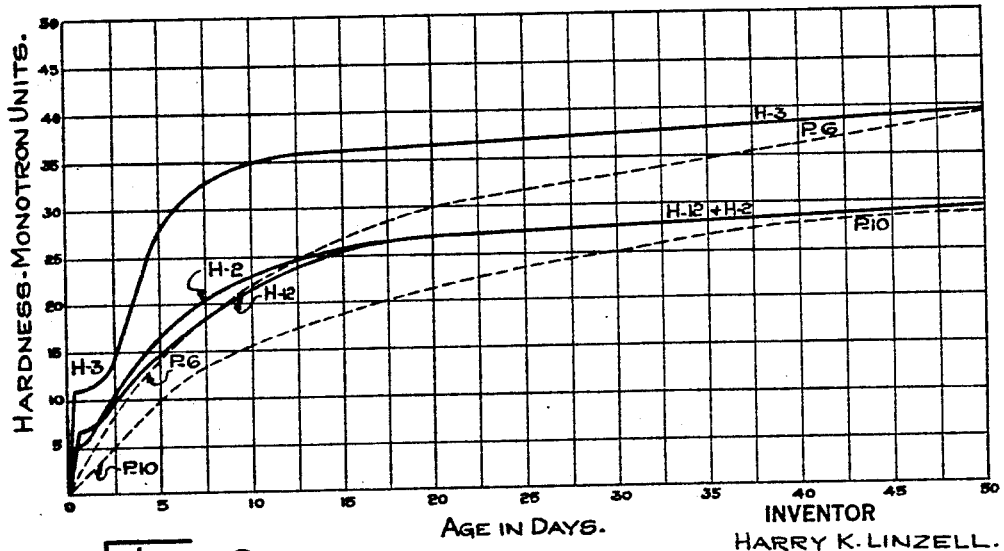
Figure 3:
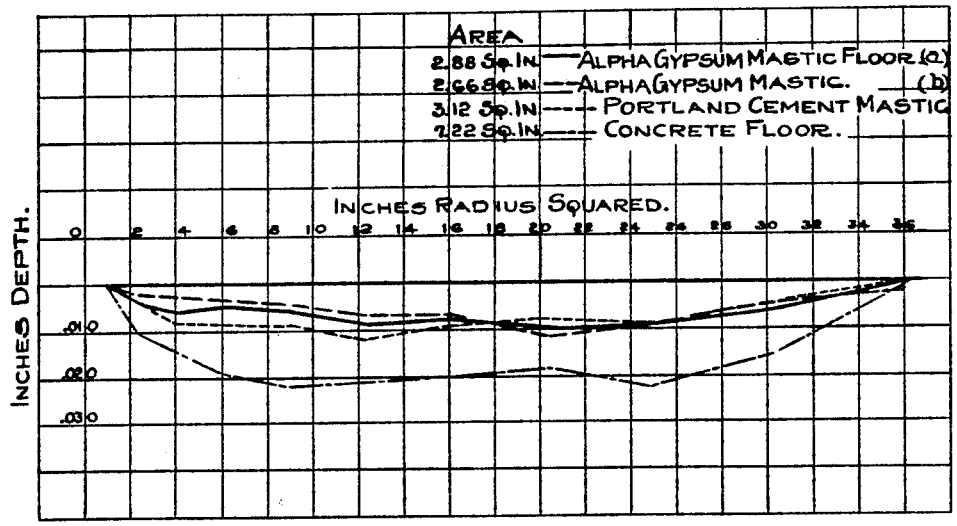
Figure 4:

Reference is to be had to the accompanying drawings forming a part of this specification, in which Fig. 1 is a triaxial graph showing the composition range of the three principal ingredients composing the mastic flooring composition compared with two Portland cement mastic compositions, Fig. 2 is a graphical chart showing the setting time of the improved composition compared with standard Portland cement mastic compositions, Fig. 3 is a graphical chart showing the wearing resistance of the improved composition compared with standard Portland cement mastic compositions, and Fig. 4 is a graphical chart showing the dimensional change of my improved composition on setting and drying compared with a standard Portland cement mastic.

In the triaxial chart shown in Fig. 1, I show the range of percentage composition which I have found suitable for mastic flooring. The several numbered points also indicate certain mixes which are especially preferred for use for flooring depending upon the condition and use to which they are to be put. These compositions contain alpha gypsum, emulsified asphalt, sand, and in some cases roofing gravel. The emulsified asphalt is a product known in the art as a dispersion of asphalt in water, and bentonite or deflocculated clay acting as an emulsifying agent. The above represent the preferred type of asphalt dispersion. Suitable dispersions may also be made, using other dispersing agents which do not react with calcium sulphate such as certain inorganic hydroxides, pigments, etc. well known to the art.

The so-called "soap type" emulsions are not satisfactory as they react with the gypsum and lime if present, to form insoluble soaps, and the emulsion is immediately broken. Inorganic emulsifying agents are in general satisfactory, but even with these, care must be taken in selection to insure that they do not react with gypsum to break down the emulsion. In representing compositions in the triaxial chart, only the solid content of the emulsified asphalt has been used. Thus, for every 100 parts of asphalt emulsion used, only about 64 parts of this would be solid matter, and the remainder would be water and would be considered merely as part of the gaging water used in the final composition. Considering this in another way, with an asphalt emulsion containing 64% solids, for each 100 parts of asphalt solids needed, 156 parts of asphalt emulsion must be taken. Where a mastic composition contains both sand and gravel, these have been shown together on the triaxial chart of Fig. 1 for convenience. The asphalt or bituminous material which I prefer to use should be of such melting point and penetration, that it has a definite flow at normal temperatures, though it should not be so soft that it has no body. I find that material with a penetration varying between 30 and 120 at 77 degrees F. suits my purpose very well, though I do not wish to confine myself to these limits, as it is entirely possible that some materials which do not come within the above range may still be suitable for my composition.

The following table gives the composition by both weight and volume of several specific compositions shown in the chart of Fig. 1.

| No. of comp. | Composition by weight | | | | Composition by volume | | | |
| --- | --- | --- | --- | --- | --- | --- | --- | --- |
| | Alpha gypsum | Asphalt (solid) | Aggregate | | Alpha gypsum | Asphalt emulsion | Aggregate | |
| | | | Sand | Gravel | | | Sand | Gravel |
| 1 | 36 | 13 | 51 | 0 | 1 | 2⅓ | 1 | 0 |
| 2 | 37 | 10 | 53 | 0 | 1 | ½ | 1 | 0 |
| 3 | 28 | 11 | 61 | 0 | 1 | ⅔ | 1½ | 0 |
| 4 | 29 | 8 | 63 | 0 | 1 | ½ | 1½ | 0 |
| 5 | 16 | 6 | 33 | 45 | 1 | ⅔ | 1½ | 2 |
| 6 | 18 | 5 | 26 | 51 | 1 | ½ | 1 | 2 |
| 7 | 13 | 4 | 28 | 55 | 1 | ½ | 1½ | 3 |
| 8 | 13 Portland cem. | 12 | 30 | 45 | 1 | 2 | 2 | 3 |
| 9 | 17 Portland cem. | 15 | 68 | 0 | 1 | 2 | 3½ | 0 |

In reading the chart, it will be found that any point represents a total of 100 parts of the three components. Thus point #1 represents 36 parts of alpha gypsum, 13 parts of solid asphalt plus clay, and 51 parts of aggregate (all sand in this case). In weighing out the asphalt emulsion, it would be necessary to use 13 times 1.56, or 13 times 100 over 64 equals 20.3 parts of asphalt emulsion. In specifications for proportioning mixtures of this type, it is customary to give the volume of each component to be used. Thus mixture No. 1 would be made by using one volume of alpha gypsum with ⅔rds. volume of emulsified asphalt and one volume of sand. Mix No. 6 would be made by using one volume of alpha gypsum, one-half volume of emulsified asphalt, one volume of sand, and two volumes of gravel. This represents by weight 18% alpha gypsum, 5% solid asphalt, and 77% fine sand and gravel and is so represented on the chart. This calculation is based on the following densities of the materials used: alpha gypsum 76 lbs. per cu. ft. emulsified asphalt 63 lbs. per cu. ft., sand and gravel each 105 lbs. per cu. ft. It is evident that a variation in density will change the location of the composition on the chart somewhat, since a certain volume relation would then represent a different weight relation.

In my research work covering a large range of composition, I have determined the possible and reasonable propositions of each component giving mastics most suitable for industrial flooring material. This work brought out several significant facts to be considered in proportioning the ingredients of the composition, as follows:

1. The hardness as measured by resistance to giving under concentrated loads, is the same in compositions having approximately the same ratio of alpha gypsum to asphalt, regardless of the quantity of aggregates used. Thus the proportions 30 alpha gypsum, 10 asphalt and 60 sand would give the same hardness as 45—15—40 mix. The ratio in each of these two cases is 3 to 1 of alpha gypsum to asphalt.

2. The hardness may be varied by changing the ratio of alpha gypsum to asphalt, the larger this ratio, the harder the resulting material,—that is, the more alpha gypsum in proportion to the asphalt, the greater the hardness, and the lower the masticity. For example, referring to the table, composition No. 3 will have a ratio by weight of 2.54 to 1, while composition No. 6 will have a ratio of 3.6 to 1.

3. The hardness of the mastic is to some extent dependent upon the hardness or melting point of the asphalt used in making the emulsion. Thus a certain percentage of low melting asphalt in a mastic would result in a softer floor than if a higher melting asphalt had been used. I prefer to use asphalt of medium hardness, say, 110–140° F. melting point.

4. The masticity, or ability to give under concentrated pressure without crumbling, is roughly the opposite of hardness. That is, a very hard composition will have less masticity than a soft one, and may be friable. Many compositions are not sufficiently mastic to hold together without crumbling when rolled with heavily loaded wheels, or when scratched with a sharp object. This undesirable crumpling or dusting property is known as friability.

5. The wearing qualities of alpha gypsum mastics are better in the softer more mastic compositions and poorer in the harder ones.

6. To a mastic containing the right proportions of alpha gypsum, asphalt and sand for suitable hardness, masticity and strength, may be added gravel without seriously affecting the properties of the material. In other words, the gravel merely serves to spread apart the mixture and make it go further. This addition of gravel is limited by the spreading and troweling qualities of the resulting mixture. It is possible to add from one to two volumes of gravel for each one of sand contained in the mix. Thus, No. 6 mix in the chart may be considered the same as No. 2, with the addition of two volumes of gravel for each one of sand. For floors which are to be used for trucking and load bearing, the gravel mix is better because the gravel particles form point to point contact for sustaining a load over them.

The choice of suitable composition depends upon several if not all of the above facts considered at the same time. To obtain sufficient hardness, there should be an alpha gypsum-asphalt ratio greater than that along the line X—X' in the chart (approximately 2–1 by weight). This means the composition must lie to the left and below the line X—X' on the chart. To have sufficient masticity and wearing qualities, the composition should be above and to the right of the line Y—Y'. By these two specifications an area is described, which includes on the chart all the compositions suitable for use as wear resistant mastic floors. Within this area, properties may vary, depending upon the ratio of alpha gypsum to asphalt, the melting point of the asphalt used, and the proportion and kind of aggregate. The allowable area for asphalt of different properties, such as melting point, penetration, etc., may be still greater than that between lines X—X' and Y—Y'. These may be chosen or varied to suit different needs. For use as an underlayment for leveling up right concrete or over wood before applying a floor covering, I may use a composition still leaner in asphalt which will, therefore, be harder but will not be mastic. For this use, the small proportion of asphalt used is to give the floor a slight degree of resiliency and flexibility.

While any portion of the area between the lines X—X' and Y—Y' on this chart represents compositions which might be used for flooring, certain reasons have led me to choose the compositions between the solid lines A—A' and B—B', and these compositions, therefore, represent my preferred compositions. The asphalt used is of medium hardness (M. P. about 130° F.). Therefore, I have not gone either to as high an alpha gypsum-asphalt ratio as possible with a softer asphalt, nor to as low a ratio as possible with a harder asphalt. In the area between the curves X—X' and Y—Y', the ingredients will vary as follows:

| | Per cent |
|---|---|
| Asphalt | 4–36 |
| Alpha gypsum | 10–77 |
| Aggregate | 0–86 |

In the area between the curves A—A' and B—B', the ingredients of the composition will vary as follows:

| | Per cent |
|---|---|
| Asphalt | 4–20 |
| Alpha gypsum | 10–60 |
| Aggregate | 25–85 |

The proportion of aggregate is determined by two or three considerations as follows:

1. It is desirable to use as much aggregate as possible without impairing working qualities and strength, because the aggregate is much cheaper than either alpha gypsum or asphalt. This leaves the composition to the left of mixes No. 1 and No. 2 generally unused because of their unwarranted extra cost. However, for certain uses in molding different objects the aggregate may be completely omitted.

2. It is preferable to use gravel, as well as sand wherever possible, to further decrease the cost. The amount of gravel, which may be used is limited by the troweling quality of the mix, and the hardness desired in the finished floor. If too much gravel is present, there will not be enough fines to trowel into a smooth surface.

3. It is desirable to use gravel in heavy duty floors, which are to be subjected to trucking, so as to obtain a load bearing point to point contact of the gravel particles.

4. It is desirable to use sand only, or perhaps a smaller amount of gravel if it is evenly graded and not too large for the thickness of the floor to be laid, when a smooth finish is desired, as for light duty floors in factories, etc., or for a smooth surface as under-layment for mastic tile, rubber tile or linoleum.

5. For certain uses it is desirable to substitute sawdust, cork dust, wood floor or similar materials in whole or in part for the sand. This is usually done on a volume basis. Small proportions may also be replaced by fillers such as silex, talc, asbestos, etc. It is evident, too, that should a colored floor or cast be desired, inert pigments may be incorporated along with or in place of some of the sand. Other materials which may be added as substitutes to alter slightly the characteristics of the floor or cast for specific purposes, are wool or cotton linters, sisal, hair, wood fiber and the like, probably not over 3%; to improve the tensile strength of the material, carborundum chips, or sand or metal filings; to improve to an even greater degree the abrasion resistance, slag, etc. Nothing new or novel is claimed for these additions or substitutions, all of which are well known to the art.

In making up my mastic compositions, I dry mix the alpha gypsum and aggregate at the job or the dry materials may be shipped in a pre-mixed condition to the job and then add sufficient water to bring the mixture up to molding consistency. 15 to 40 parts by weight of water including that in the asphalt emulsion, per 100 parts of the dry mixture, are usually required for this purpose. The proper amount of asphalt emulsion is then thoroughly mixed into the mortar. The addition of an expansion controlling agent to the dry mix is preferable but not essential. This expansion controlling agent may consist of 1 to 5% of Portland cement or 0 to 2% of hydrated lime. This expansion controlling agent helps to cause the asphalt after the water has dried out to wet the aggregate more thoroughly and produce a tighter floor or cast, at the same time serving to reduce the expansion or contraction of the mastic to nearly zero, on setting and drying, as seen in Fig. 4.

In this chart, Fig. 4, curve No. 1 is for the composition, 1—½—1½ by volume using straight alpha gypsum. This mastic has an expansion of a little over 0.2% during the setting period of about an hour. After this there is a slight contraction during a 10 days drying period. Curve No. 2 represents a 1—½—1½ mixture using alpha gypsum containing 5% of Portland cement. It will be noted that this composition has a very slight expansion during setting which is exactly compensated for by the slight contraction during drying, making a net zero change in volume. This same effect may be obtained by using a smaller percentage of lime instead of Portland cement. Curve No. 3 represents a 1—2—3½ Portland cement mastic which shows a 0.2% shrinkage during the first 1½ days setting time, followed by an additional 0.1% shrinking during 10 days of drying.

The advantages of alpha gypsum mastic over mastic flooring made with Portland cement and emulsified asphalt, are numerous:

1. The same hardness and masticity may be obtained with alpha gypsum by the use of much less asphalt. For example the Portland cement mastic commonly used for light duty floors is 1—2—3½ parts by volume. It is located at point No. 9 on the chart (Fig. 1) and contains 15% solid asphalt. The alpha gypsum composition most nearly matching this and used for the same type of floors, is represented by point No. 4 and contains 8% solid asphalt and is approximately a 1—½—1½ composition. Similarly, the heavy duty mastics No. 8 containing Portland cement, emulsified asphalt and gravel, and No. 6, containing alpha gypsum, emulsified asphalt and gravel are about equivalent. The saving in cost by this reduction in amount of asphalt is important, because the asphalt is by far the most expensive component of the mastic composition.

2. The alpha gypsum mastic goes into a quick initial set as seen in Fig. 2, where the solid lines represent the alpha gypsum mastic and the dotted lines represent the Portland cement mastic. The alpha gypsum mastics become hard enough to walk on in a few hours, and to work over after a day or so. This enables a floor to be laid on one afternoon and to be opened up to light duty the following day, and to heavy duty in 1½ to 2 days. This short installation time requirement is out of the question with Portland cement mastics, which set and harden much more slowly.

3. Alpha gypsum mastics containing the expansion controlling agent, do not shrink in setting and drying as do Portland cement mastics, (Fig. 4). Where Portland cement mastics almost always show map cracks on setting and drying, those mastic floors made of my improved alpha gypsum-asphalt composition are entirely free from map cracks.

4. Alpha gypsum mastics are better adapted to patch work and feather edging than Portland cement mastics. The non-cracking and non-shrinking qualities of the alpha gypsum mastic are responsible for this advantage. It is well known that cracking and shrinking is much worse in Portland cement mastics when the drying is too rapid at first. In the thin film feather edges, it is difficult, if not impossible, to prevent rapid drying.

5. Alpha gypsum mastics are more acid resistant than Portland cement mastics. This is especially true of certain inorganic acids, such as sulphuric and hydrochloric, which are commonly used in industrial plants.

6. The wearing qualities of the alpha gypsum mastics are superior to those of either Portland cement mastics or ordinary concrete floors as seen in Fig. 3.

The wearing qualities of the alpha gypsum mastic floors, and other floors, have been measured by an abrasion testing machine, commonly used in testing composition flooring. This apparatus consists of a circular retaining ring 12" in diameter with a flange at the bottom to rest on the test specimens. A horizontal blade fastened at its center to a vertical shaft, revolves in the ring and pushes before it a set of six steel cubes, three on each side of the center. These cubes are 1½" on each edge and the combined weight is about 2500 grams. The blade revolves at approximately 50 revolutions per minute, driven by a small motor, a counting device being used to record the number of revolutions of the blade. As an abrasive material, I used sand blast silica sand in conjunction with the steel cubes, one kilogram of sand being used for each 2,000 revolutions. As a rule, three charges of sand for a total of 6,000 revolutions provides sufficient wear of the specimens to give significant data. The depth of wear across the abraded area is then accurately measured by a micrometer, and this depth of wear is plotted against the square of the radius of the circle at any given point to produce the curves shown in Fig. 3. The wear resistance of the flooring is inversely proportional to the amount of the material removed or worn away from the surface. This amount of material removed or worn away can be calculated by plotting the curve shown in Fig. 3 and the area obtained between these curves and the horizontal. If the resistance to wear of a hard maple floor is taken as one, the other floors tested then have the following wear factors:

Alpha gypsum mastic floor "a"_____ .8
Alpha gypsum mastic floor "b"_____ 0.87
Portland cement mastic floor_____ 0.74
Ordinary concrete floor_____ 0.32

It will be seen in a further consideration of Fig. 2, that the mastics containing alpha gypsum have a short setting period of a few hours after mixing, then a period of rapid hardening during the first two weeks after which they increase in hardness only very slowly, approaching a time of no further increase. The Portland cement mastics, on the other hand, have no sharp changes in rate of hardening during the early stages. On this chart, the composition H—3 and P—6 having the same hardness at 50 days, are shown for comparison. It will be seen that at all times up to the final 50 day age, the mastic containing alpha gypsum was harder than the Portland cement mastic, especially at the early stages. At 10 days age, the alpha gypsum composition had reached a hardness of 35, comparable to its final hardness of 39, while at 10 days age the Portland cement mastic had only about half its final hardness. It should be borne in mind that the hardness may be varied by changing the ratio of asphalt to cementing agents for either alpha gypsum or Portland cement mastics, thus giving any desired final hardness, but for any kind of final hardness, the hardening rate will be as shown in these charts.

In this Fig. 2, the compositions represented by the different curves, are as follows:

|  |  | Asphalt | Sand |
|---|---|---|---|
| H—3 | Alpha gypsum 40 | 10 | 50 |
| H—12 | Alpha gypsum 45 | 15 | 40 |
| H—2 | Alpha gypsum 30 | 10 | 60 |
| H—6 | Portland cement 30 | 20 | 50 |
| P—10 | Portland cement 17.5 | 15 | 67.5 |

Ordinary calcined gypsum will not take the place of the alpha gypsum, for the reason that it has been found impossible to secure the combination of both adequate hardness and masticity in any given composition. Those compositions in which a high enough proportion of ordinary calcined gypsum is used in relation to the asphalt to secure adequate hardness, are friable and disintegrate under traffic, while if sufficient asphalt is used to secure the masticity required to overcome this crumbling action, the composition is so soft that truck wheels with even average loads sink into the floor and it is useless.

Where the term "alpha gypsum" or "high strength calcined gypsum" is used, this is intended to include as well the small percentage of retarding agents which are always used with calcined gypsum whenever the time of set required is over 10 to 15 minutes.

I would state in conclusion, that while the illustrated examples constitute a practical embodiment of my invention, I do not wish to limit myself precisely to these details, since manifestly, the same may be considered varied without departing from the spirit of the invention as defined in the appended claims.

Having thus described my invention, I claim as new and desire to secure by Letters Patent:

1. A molding composition comprising asphalt emulsion, alpha gypsum, an expansion controlling agent, and water to bring to mortar consistency.

2. The method of making a molding composition, which comprises dry mixing calcined gypsum having a strength of 2500–5750 lbs. per sq. in. when set with water at pouring consisting and aggregate adding and mixing water to mortar consistency, and mixing asphalt emulsion with said mortar.

3. The method of making a molding composition which comprises dry mixing alpha gypsum, an aggregate and an expansion controlling agent, adding and mixing water to mortar consistency, and mixing asphalt emulsion with said mortar.

4. The method of making a molding composition which comprises dry mixing alpha gypsum and an aggregate, adding and mixing 15–40 lbs. of water to 100 lbs. of the above mixture to produce a mortar and mixing asphalt emulsion with said mortar.

5. A mastic flooring composition comprising the following ingredients in approximately the proportions named by volume:

Alpha gypsum _____ 1
60% asphalt emulsion _____ ½
Aggregate _____ 1–2
Water to render the mixture plastic.

6. A mastic flooring composition comprising the following ingredients in approximately the proportions named by volume:

Alpha gypsum _____ 1
60% asphalt emulsion _____ ⅔
Aggregate _____ 1–2
Water to render the mixture plastic.

7. A mastic flooring composition comprising the following ingredients in approximately the proportions named by volume:

Alpha gypsum _____ 1
60% asphalt emulsion _____ ⅔
Sand _____ 1½
Gravel _____ 2
Water to render the mass plastic.

8. A mastic flooring composition comprising the following ingredients in approximately the proportions named by volume:

Alpha gypsum _____ 1
60% asphalt emulsion _____ ½
Sand _____ 1½
Gravel _____ 3
Water to render the mixture plastic.

9. A composition suitable for leveling up old wood or concrete floors for the purpose of laying on or attaching a floor covering material thereto, of the following approximate composition by volume:

Alpha gypsum _____ 1
60% asphalt emulsion _____ ¼
Sand _____ 1 to 2

10. A surfacing composition comprising alpha gypsum, asphalt, and sand, so compounded that the ratio of alpha gypsum to solid asphalt by weight is as 4 is to 1.

11. A surface composition comprising alpha gypsum, asphalt, and sand so compounded that the ratio of alpha gypsum to solid asphalt by weight is as 7 is to 3.

12. A mastic composition containing alpha gypsum, asphalt, and aggregates, including sand, in which the alpha gypsum to asphalt ratio by weight varies between 3.25 and 1.75, with the total aggregate depending upon the use between the limits of 0 and 85% by weight.

13. A mastic composition comprising from 10 to 77 parts by weight of alpha gypsum, 4 to 36 parts by weight of asphalt, and 0 to 86 parts by weight of an aggregate, the total combined enumerated ingredients always to total 100 parts by weight.

14. A mastic composition comprising from 10 to 60 parts by weight of alpha gypsum, 4 to 20 parts by weight of asphalt, and 25 to 85 parts by weight of an aggregate, the total combined enumerated ingredients always to total 100 parts by weight.

15. A mastic composition comprising from 10 to 77 parts by weight of alpha gypsum, 4 to 36 parts by weight of asphalt, and 0 to 86 parts by weight of an aggregate, the total of the combined enumerated ingredients to equal 100 parts by weight, and from 1 to 5 parts of Portland cement as an expansion-controlling agent.

16. A mastic composition comprising from 10 to 77 parts by weight of alpha gypsum, 4 to 36 parts by weight of asphalt, and 0 to 86 parts by weight of an aggregate, the total of the combined enumerated ingredients to equal 100 parts by weight, and not to exceed 2 parts of lime as an expansion controlling agent.

HARRY K. LINZELL.